(12) United States Patent
Coman et al.

(10) Patent No.: US 6,739,668 B2
(45) Date of Patent: May 25, 2004

(54) VEHICLE SEAT HINGE MECHANISM WITH RECLINING WITH FORWARD DUMPING, MEMORY RETURN AND FOLD-FLAT FUNCTIONALITY

(75) Inventors: Sorin Coman, Ann Arbor, MI (US); Alex Giuro, Rochester Hills, MI (US); Wojciech Smuk, Troy, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 51 days.

(21) Appl. No.: 10/170,693

(22) Filed: Jun. 14, 2002

(65) Prior Publication Data
US 2003/0056329 A1 Mar. 27, 2003

Related U.S. Application Data
(60) Provisional application No. 60/298,122, filed on Jun. 15, 2001.

(51) Int. Cl.[7] ................................................. B60N 2/02
(52) U.S. Cl. .................................................. 297/378.12
(58) Field of Search ........................ 297/378.12, 378.1, 297/354.12, 376, 374

(56) References Cited

U.S. PATENT DOCUMENTS

| 4,382,630 | A | * | 5/1983 | Weston |
| 4,687,252 | A | * | 8/1987 | Bell et al. |
| 5,393,116 | A | * | 2/1995 | Bolsworth et al. |
| 6,139,104 | A | * | 10/2000 | Brewer |
| 6,336,679 | B1 | * | 1/2002 | Smuk |
| 6,513,875 | B1 | * | 2/2003 | Gray et al. |
| 6,601,921 | B1 | * | 8/2003 | Collins |

* cited by examiner

Primary Examiner—Milton Nelson, Jr.
(74) Attorney, Agent, or Firm—Patrick J. Hofbauer

(57) ABSTRACT

A hinge is disclosed, which forms part of a vehicle seat which includes a seat cushion and a cushion plate attached thereto. The fixed part of a rotary recliner, having a handle extending therefrom, is mounted to the cushion plate. An idler plate is mounted to the movable part of the recliner, for rotation therewith. A sector plate, which carries a seat back, has a first position relative to the idler plate, and is lockable thereat by a latch, for rotation with the idler plate under control of the handle. This permits the seat back to be pivoted to a preferred seating position via the recliner when the latch is engaged. When the latch is disengaged, the sector plate is forwardly rotatable, relative to the idler plate, from the preferred position. A spring biases the latch to re-engage the sector plate upon rearward rotation thereof back to its first position.

18 Claims, 16 Drawing Sheets

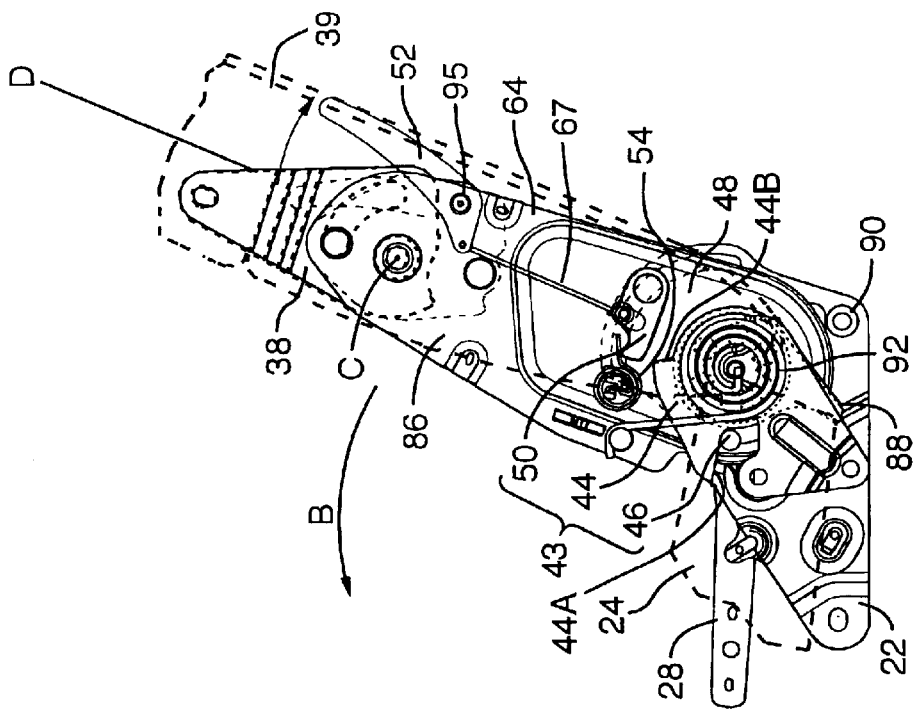

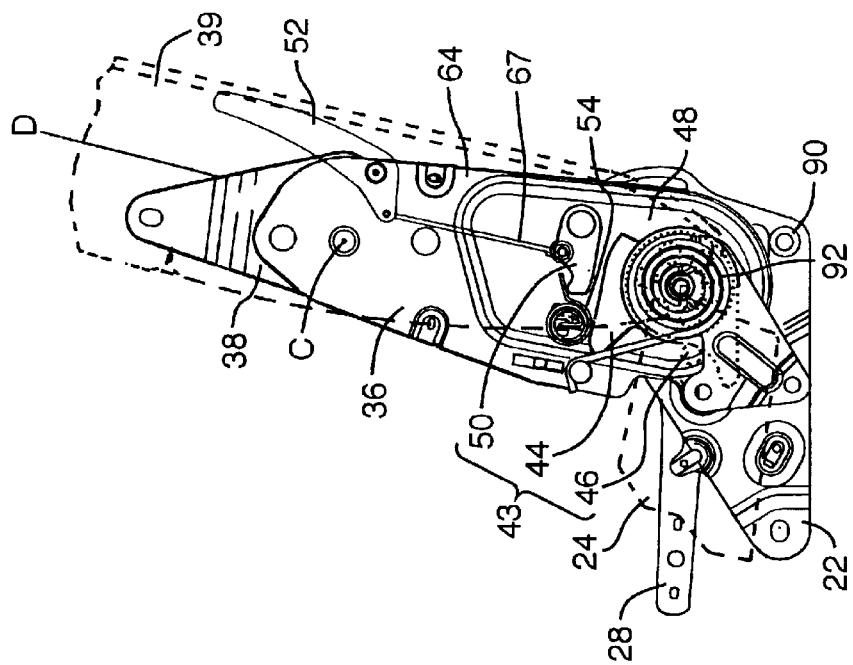
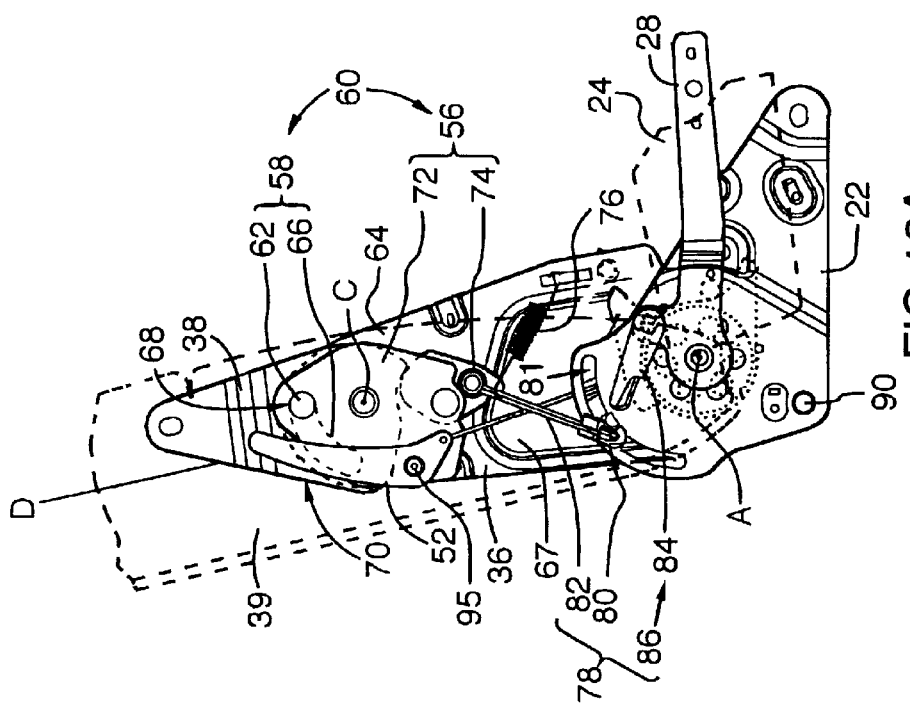
FIG.12B
FIG.12A

VEHICLE SEAT HINGE MECHANISM WITH RECLINING WITH FORWARD DUMPING, MEMORY RETURN AND FOLD-FLAT FUNCTIONALITY

CROSS-REFERENCE TO CO-PENDING APPLICATIONS

This application claims the benefit of U.S. Provisional Application No. 60/298,122, filed Jun. 15, 2001.

FIELD OF THE INVENTION

The present invention relates to hinge mechanisms for vehicle seats, and more particularly, to an improved vehicle seat hinge mechanism having reclining, forward dumping with memory return, and fold-flat functionality.

BACKGROUND OF THE INVENTION

Passenger vehicles commonly have vehicle seat assemblies provided with both reclining and forward dumping functionality which permits the seat back to be selectively reclined about a lower pivot axis through a range of substantially upright, occupiable positions for selection by the user of a preferred seating position, and to also be rapidly tilted forwardly about said lower pivot axis to a so-called "dumped position" at which dumped position the seat back is forwardly tilted to an unoccupiable position that projects in vertically angled relation over the seat cushion, so as to facilitate ingress and egress to and from the interior space in the vehicle to the rear of the seat assembly.

Such vehicle seat assemblies typically comprise a pair of vehicle seat hinge mechanisms disposed on opposite lateral sides of the vehicle seat assembly, with each such hinge mechanism having a seat cushion mounting plate securely attached to the seat cushion and a sector plate operatively securely attached to the seat back.

The two hinge mechanisms of each pair are typically connected to one another by a system of slave rods or cables, as is well-known in the art, for simultaneous actuation, thereby to reduce the total number of user handles required to control all functions of the pair of vehicle seat hinges associated with each seat assembly.

Rotary recliners are commonly utilized in hinge mechanisms to provide for controlled reclining of the seat back about the lower pivot axis in the general manner discussed above. Advantages of known rotary recliners include that they are relatively inexpensive to manufacture, have their working components substantially enclosed (which lends to their reliability and safety), are relatively lightweight, and fit into a relatively small design envelope. One suitable rotary recliner is disclosed in U.S. Pat. No. 6,336,679 (Smuk et al.), issued Jan. 8, 2002, which is incorporated herein by reference.

Sometimes, it is desirable that a seat assembly also be provided with "memory return" functionality, such that once a preferred seating position has been selected by a user, the seat back locks automatically when it returns to the preferred position after a dumping operation.

Vehicle seat assemblies utilizing rotary recliners and also providing memory return functionality are not generally known in the prior art. Rather, most prior hinge mechanisms having rotary recliners and providing memory return functionality typically rely upon relatively bulky stamped metal components external to the rotary recliner that can be expensive and difficult to assemble, which add excessive weight to the vehicle seat assembly, or comprise complicated systems of master and slave adjustment rods, such as the system disclosed in U.S. Pat. No. 6,315,361 (Stone et al.), issued Nov. 13, 2001.

Combined passenger and utility type vehicles, such as mini-vans and sport utility vehicles, commonly have a second and sometimes a third row of seats that additionally have "fold-flat" functionality, which also permits the seat back to be tilted forwardly about a higher pivot axis displaced above said lower pivot axis to a fold-flat position, whereat the seat back substantially overlies the seat cushion in generally horizontal relation. In such position, the back surface of the seat back constitutes a load bearing surface. Thus, placing a seat back in its fold-flat position facilitates carriage of large or lengthy objects inside the vehicle and provides a convenient, substantially horizontal, load bearing surface for articles that might be found in said vehicle, such as briefcases, laptop computers, and food and drink. Generally speaking, with most vehicle seat assemblies, the back surface of the seat back is not sufficiently horizontal during a dumping operation to provide a safe load bearing surface, as it retains a significant degree of vertical inclination about the lower pivot axis relative to the seat cushion. For this reason, pivoting of the seat back about the aforementioned higher pivot axis, which is upwardly displaced from the first pivot axis, is generally required to provide for a sufficiently horizontal orientation of the load bearing surface formed by the back surface of the back rest.

Accordingly, it is an object of the present invention to provide an improved vehicle seat hinge mechanism that provides the functionality of a rotary recliner, forward dumping, and a return memory feature, all in a compact, simple device that is reliable, cost-effective, lightweight, smaller, easy to manufacture by mass production methods, and simple to assemble as compared to prior art devices having similar functionality.

SUMMARY OF THE INVENTION

In accordance with the present invention there is disclosed an improved vehicle seat hinge mechanism for use in a vehicle seat assembly. The improved vehicle seat hinge mechanism has a seat cushion mounting plate, a rotary recliner, a sector plate and a seat back mounting plate. The seat cushion mounting plate is securely attachable to a vehicle seat cushion. The rotary recliner has a first portion and a second portion. The first portion defines a lower pivot axis and is rigidly attached to said seat cushion mounting plate. The second portion is mounted to the first portion for selective pivotal movement relative thereto about said lower pivot axis under the control of a recliner actuation handle. The sector plate is operatively mounted on the second portion of the rotary recliner for selective pivotal movement therewith about the lower pivot axis under the control of said recliner actuation handle, as aforesaid, thereby defining a first modality of pivotal movement of said sector plate about said lower pivot axis. The seat back mounting plate is operatively mounted on said sector plate and securely attachable to a vehicle seat back.

The improved vehicle seat hinge mechanism disclosed herein provides, when installed in said vehicle seat assembly and through the agency of said sector plate moving in said first modality, for said seat back to be pivotally movable with respect to said seat cushion about said lower pivot axis within a range of angular positions including a preferred seating position, a fully-inclined position and a fully-reclined position.

According to one aspect of the invention, the improvement comprises having the sector plate being mounted on said second portion of the rotary recliner as aforesaid by means of an idler plate.

The idler plate is so mounted in fixed relation to said second portion for selective simultaneous pivotal movement of the sector plate, the idler plate and the second portion about said lower pivot axis under control of the recliner actuation handle in said first modality. The idler plate has a bearing surface to which the sector plate is journalled to provide for pivotal movement of said sector plate relative to said idler plate about the lower pivot axis between a first position and a second position, thereby to define a second modality of pivotal movement of the sector plate about said lower pivot axis and to provide, when said improved vehicle seat hinge mechanism is installed in said vehicle seat assembly and through the agency of said sector plate moving in said second modality, for said seat back to be pivotally movable with respect to said seat cushion about said lower pivot axis between a primary position, whereat the sector plate is at its first position, and a secondary position, tilted forwardly relative to the primary position, whereat the sector plate is at its second position.

The improvement further comprises having a quick-release actuation member, a first lock means for selectively releasably locking the sector plate at its first position relative to the idler plate to prevent movement of the sector plate in said second modality, such release being under control of said quick-release actuation member, and first bias means for causing said locking of the first lock means.

Thus, when the improved vehicle seat hinge mechanism is installed in the vehicle seat assembly, it provides reclining functionality by permitting, under control of the recliner actuation handle, pivotal movement of the seat back to a preferred seating position within the range of available angular positions, by way of the sector plate moving in said first modality. Release of the recliner actuation handle by the user when the seat back is at the preferred position causes the rotary recliner to again lock up to hold the seat back in said preferred seating position.

The improved vehicle seat hinge mechanism disclosed herein further provides dumping functionality by permitting, under control of the quick-release actuation member, the seat back to be tilted forwardly from said selected position towards a forwardly dumped position, whereat the seat back overhangs the seat cushion, by agency of said sector plate moving in said second modality. It further provides for seat back memory by means of activation of said first lock means upon return of the seat back in said second modality to said selected position after a dumping operation.

According to another aspect of the invention, preferably, the sector plate defines an upper pivot axis and the seat back mounting plate defines a seat back axis and is mounted on said sector plate for pivotal movement, about said upper pivot axis and relative to the sector plate, between an extending position, whereat the seat back axis is arranged substantially radially relative to the lower pivot axis, and a nesting position, substantially transverse to the extending position. This provides, when said hinge mechanism is installed in said vehicle seat assembly, for fold-flat functionality, by providing for said seat back to be pivotally movable with respect to said seat cushion, by agency of said seat back mounting plate pivotally moving between its extending position and its nesting position, between a substantially upright position within the range and a fold-flat position, whereat the seat back substantially horizontally overlies the seat cushion.

According to a further aspect of the invention, the hinge mechanism preferably further comprises a second lock means for selectively releasably locking the seat back mounting plate at its extending position.

According to yet a further aspect of the invention, the hinge mechanism preferably further comprises an actuation means for releasing the second lock means, under control of the recliner actuation member, upon pivotal movement of the seat back to the upright position from a triggering position which is tilted rearwardly relative to the upright position.

According to yet another aspect of the invention, the hinge mechanism preferably further comprises a recliner actuation handle operatively mounted to the first portion of the rotary recliner for pivotal movement between a rest position and an in-use position and operatively connected to the rotary recliner so as to permit said pivotal movement of the second portion of the rotary recliner upon movement of the recliner actuation handle away from the rest position.

According to still another aspect of the invention, the quick-release actuation member is preferably a quick-release actuation handle, operatively pivotally mounted to the upper part of the sector plate for movement between a rest position and a dumping position and operatively connected to the first lock means to release same upon movement to the dumping position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, which are briefly described hereinbelow.

BRIEF DESCRIPTION OF THE DRAWINGS

In the drawings, only portions of the seat back and the seat cushion of the vehicle seat assembly are shown. As well, for clarity, components of the vehicle seat assembly, other than the hinge mechanism are depicted, in phantom outline. In the drawings:

FIG. 10A is a view similar to FIG. 9A, with the quick-release actuation handle disposed at its dumping position;

FIG. 10B is a view of the opposite side of the structure of FIG. 10A;

FIG. 12A is a side elevational perspective view of the seat hinge mechanism of FIG. 1, with the sector plate thereof disposed at its second position;

FIG. 12B is a view of the opposite side of the structure of FIG. 12A;

DETAILED DESCRIPTION OF A PREFERRED EMBODIMENT

Figure 13:
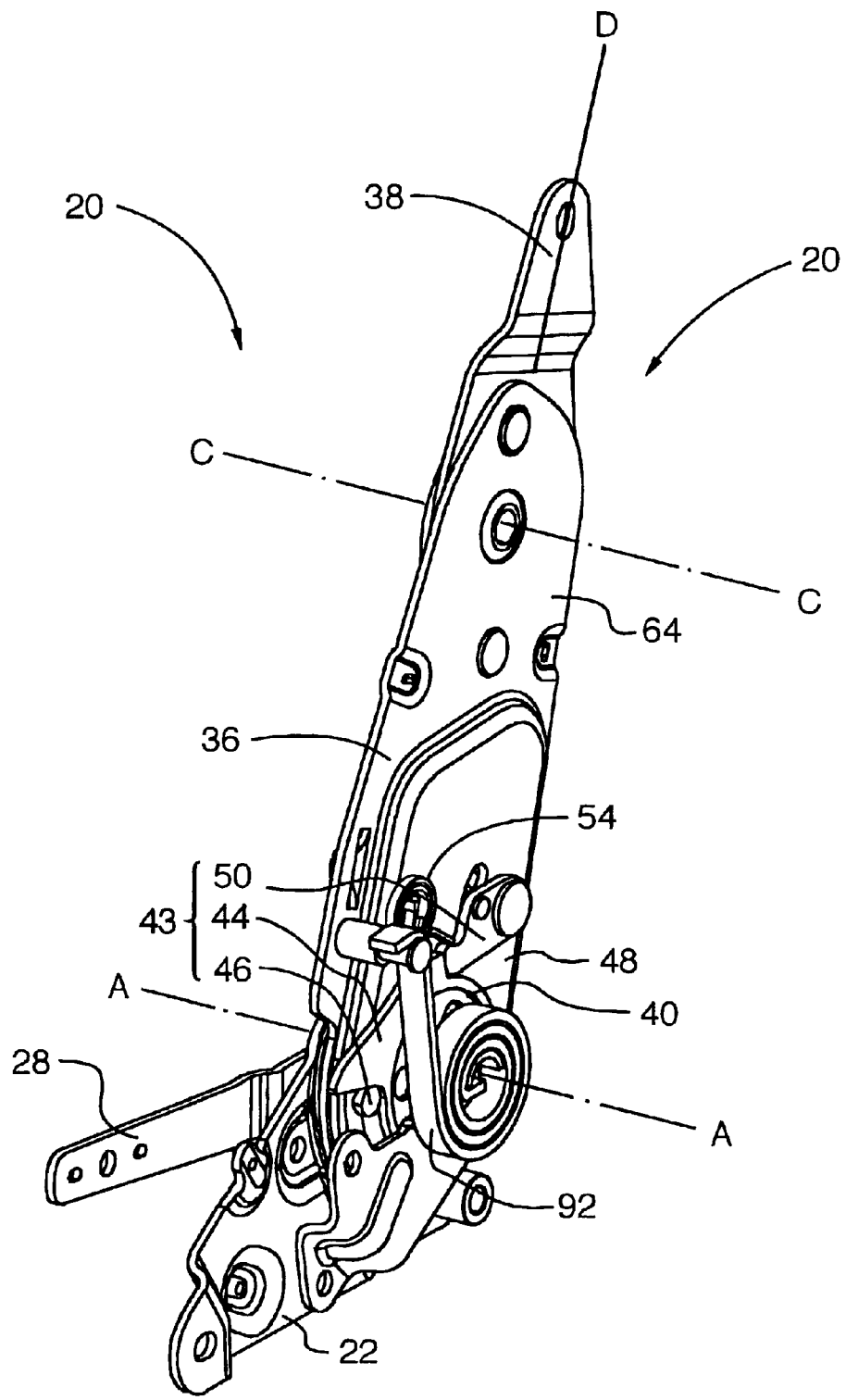
FIG. 13 is a top, side perspective view of the structure of FIG. 2.
Figure 15:
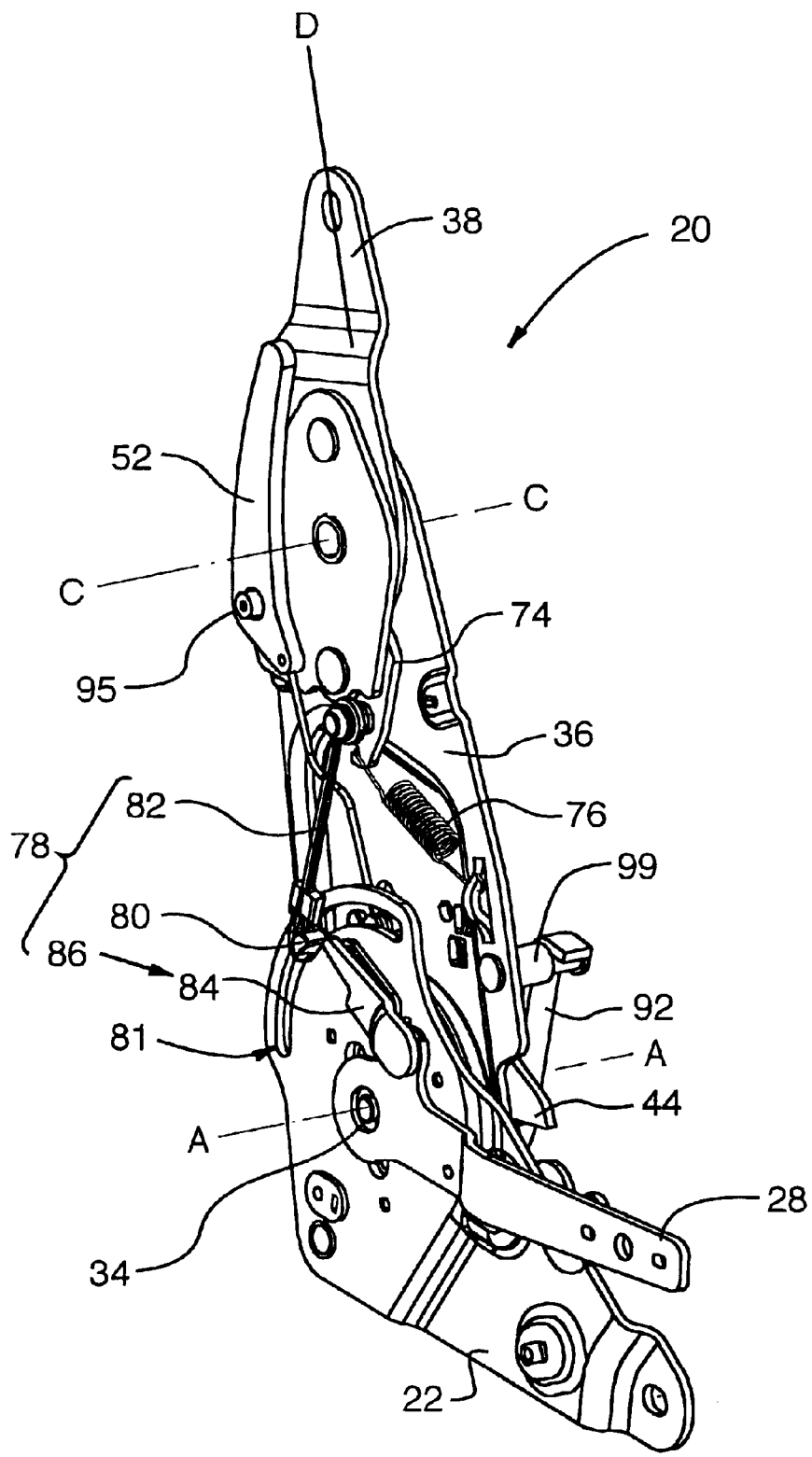
FIG. 15 is a perspective view of the structure of FIG. 2, taken from the side opposite to that of FIG. 13.

Referring now generally to FIG. 13 and FIG. 15 of the drawings, a preferred embodiment of an improved vehicle seat hinge mechanism according to the present invention is illustrated and designated with general the reference numeral 20, with common reference numerals being used throughout the Figures to denote like parts thereof.

The particulars of the structure of the various parts and the interaction between such parts, as well as the use and operation of the invention, will be fully described in the following paragraphs.

However, for greater clarity in such following description, several main components of the preferred embodiment, and their general manner of operation will be firstly described.

In this regard, it should be understood that the improved vehicle seat hinge mechanism 20 comprises a seat cushion mounting plate 22. The seat cushion mounting plate 22 is securely attachable to a vehicle seat cushion by conventional fastening means (not shown), as is well known in the art, and is illustrated so attached to a seat cushion 24 in, inter alia, FIG. 1.

Figure 14:
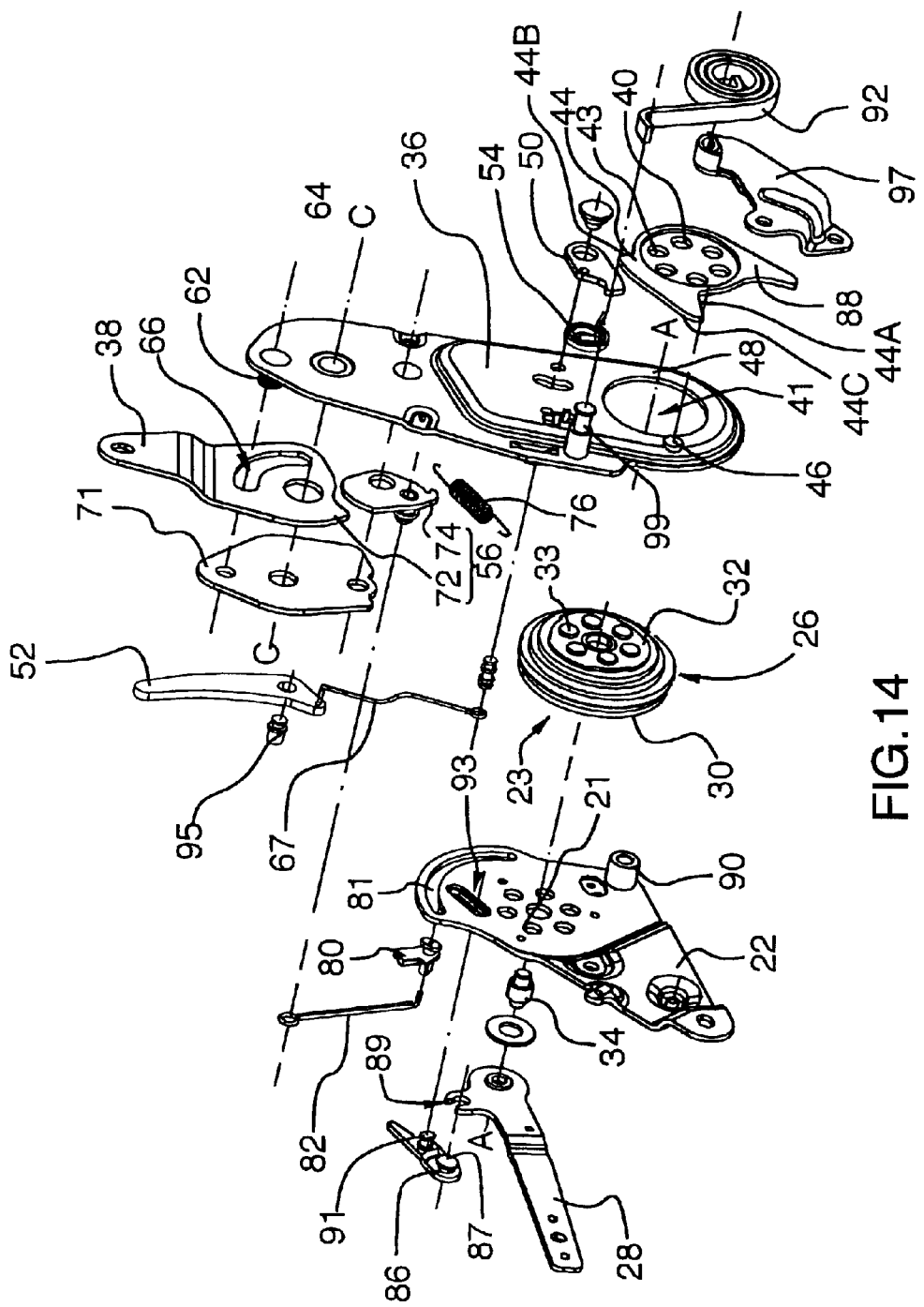
FIG. 14 is an exploded perspective view of the structure of FIG. 13.
Figure 16:
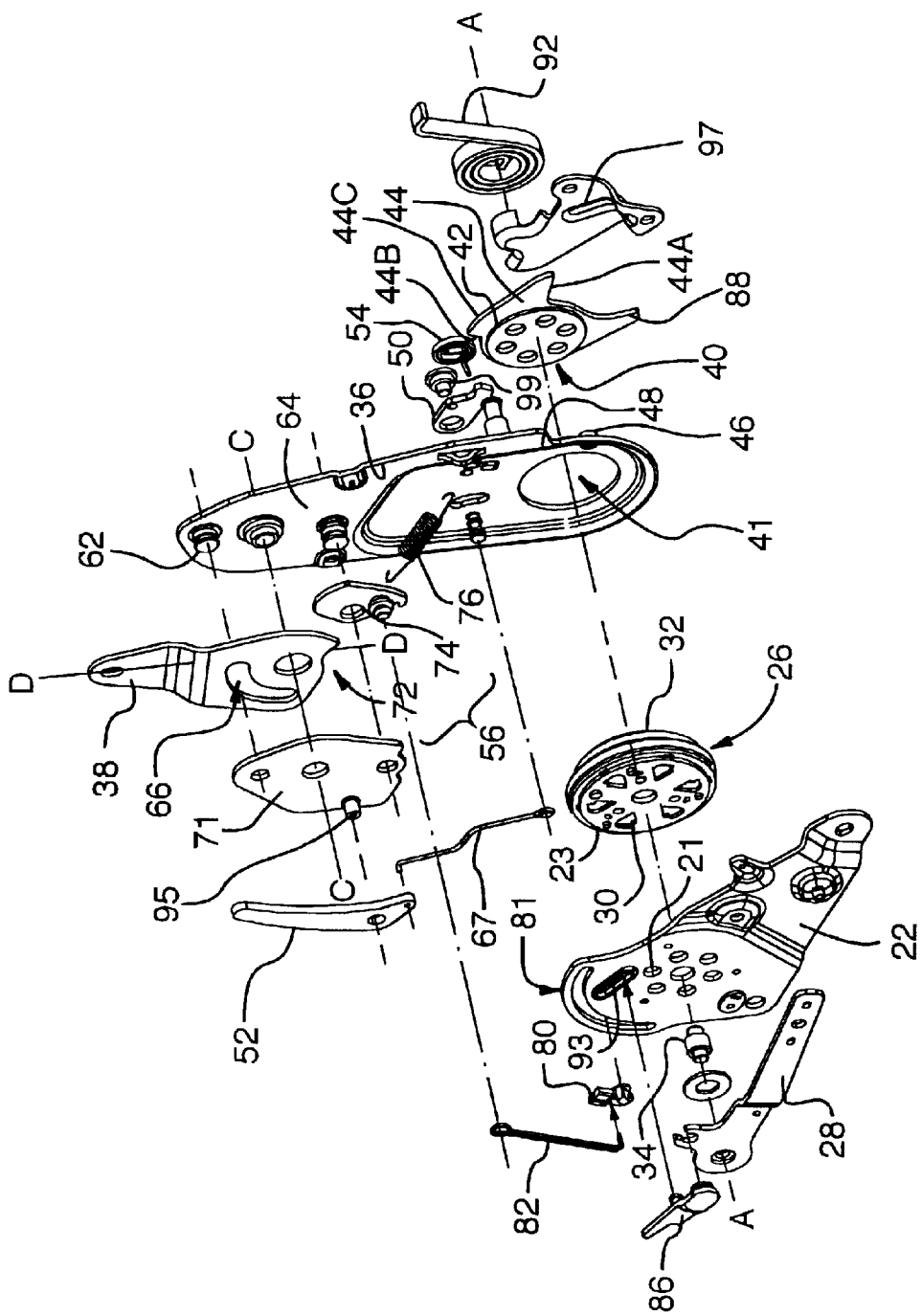
FIG. 16 is an exploded view of the structure of FIG. 15.

As best illustrated in FIG. 14 and FIG. 16, a rotary recliner 26 and a recliner actuation handle 28 are also included.

While other types of known rotary recliners have utility in this type of application, a specific form of rotary recliner as shown and suitable for this application is available from Faurecia Automotive Seating, Inc., of Troy, Mich., as Discontinuous Round Recliner Part No. 499202, for right-handed applications, or Part No. 4999203, for left-handed applications. (A right-handed application, only, is shown.)

The rotary recliner 26 has a first portion 30 and a second portion 32. The first portion 30 defines a lower pivot axis A, best illustrated in FIG. 15, and is rigidly attached to the seat cushion mounting plate 22 by conventional means, such as, for example, staking of tabs 23 within complementary holes 21 provided in the seat cushion mounting plate 22. The second portion 32 of the rotary recliner 26 is mounted to the first portion 30 for selective pivotal movement relative thereto about the lower pivot axis A. The recliner actuation handle 28 is operatively mounted to the first portion 30, by means of a control shaft 34, best seen in FIG. 16, which shaft 34 protrudes through the seat cushion mounting plate 22 from the first portion 30 in alignment with the lower pivot axis A, for pivotal movement about the lower pivot axis A between a rest position and an in-use position, shown respectively in FIG. 2 and FIG. 3. The shaft 34 is biased from the internal workings of the rotary recliner to move the recliner actuation handle 28 to the rest position, wherein the rotary recliner 26 locks up.

As known in the art, internal locking components (not shown) of the rotary recliner 26 permit said selective rotation of the second portion 32 relative to the first portion 30 upon movement of these internal locking components away from their said respective locked configurations. Such internal locking components are operatively connected to the control shaft 34, and are moved away from their locked configuration upon movement of the recliner actuation handle 28 by a user away from the rest position thereof, as indicated by arrow F in FIG. 3.

Figure 3:
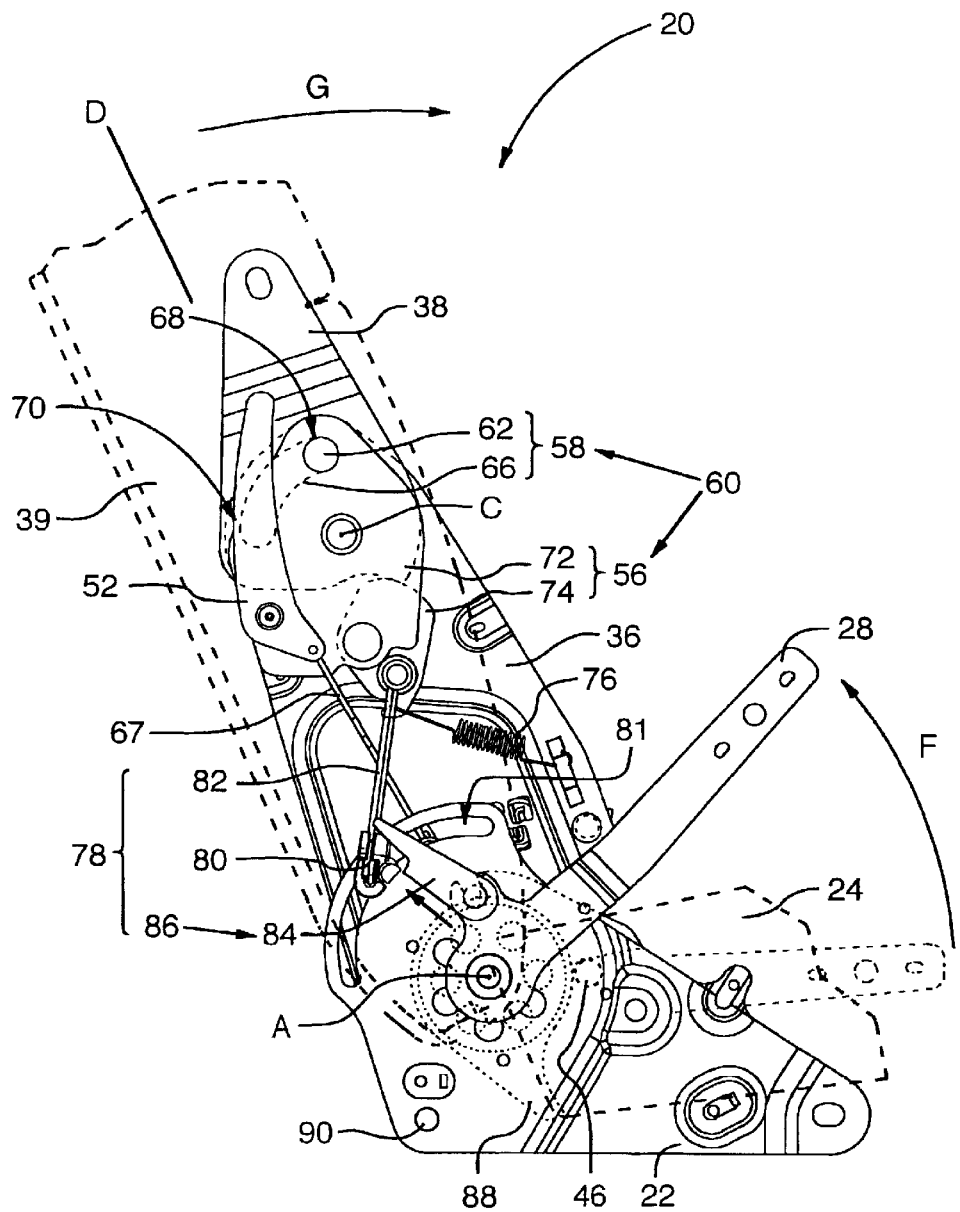
FIG. 3 is a view similar to FIG. 2, with the recliner actuation handle disposed at its in-use position.

As illustrated, inter alia, in FIG. 13, the hinge mechanism 20 further comprises a sector plate 36 operatively mounted on the second portion 32 (in a manner more fully discussed in following paragraphs) for selective pivotal movement therewith about the lower pivot axis A under the control of the recliner actuation handle 28 as aforesaid, thereby defining a first modality of pivotal movement of the sector plate 36 about the lower pivot axis A, as indicated by arrow G in FIG. 3.

As well, a seat back mounting plate 38 is also provided, and is operatively mounted on the sector plate 36 in a manner more fully described in following paragraphs. The seat back mounting plate 38 is securely attachable to a vehicle seat back by conventional means well-known in the art, and is illustrated so attached to seat back 39 in FIG. 1.

Figure 1:
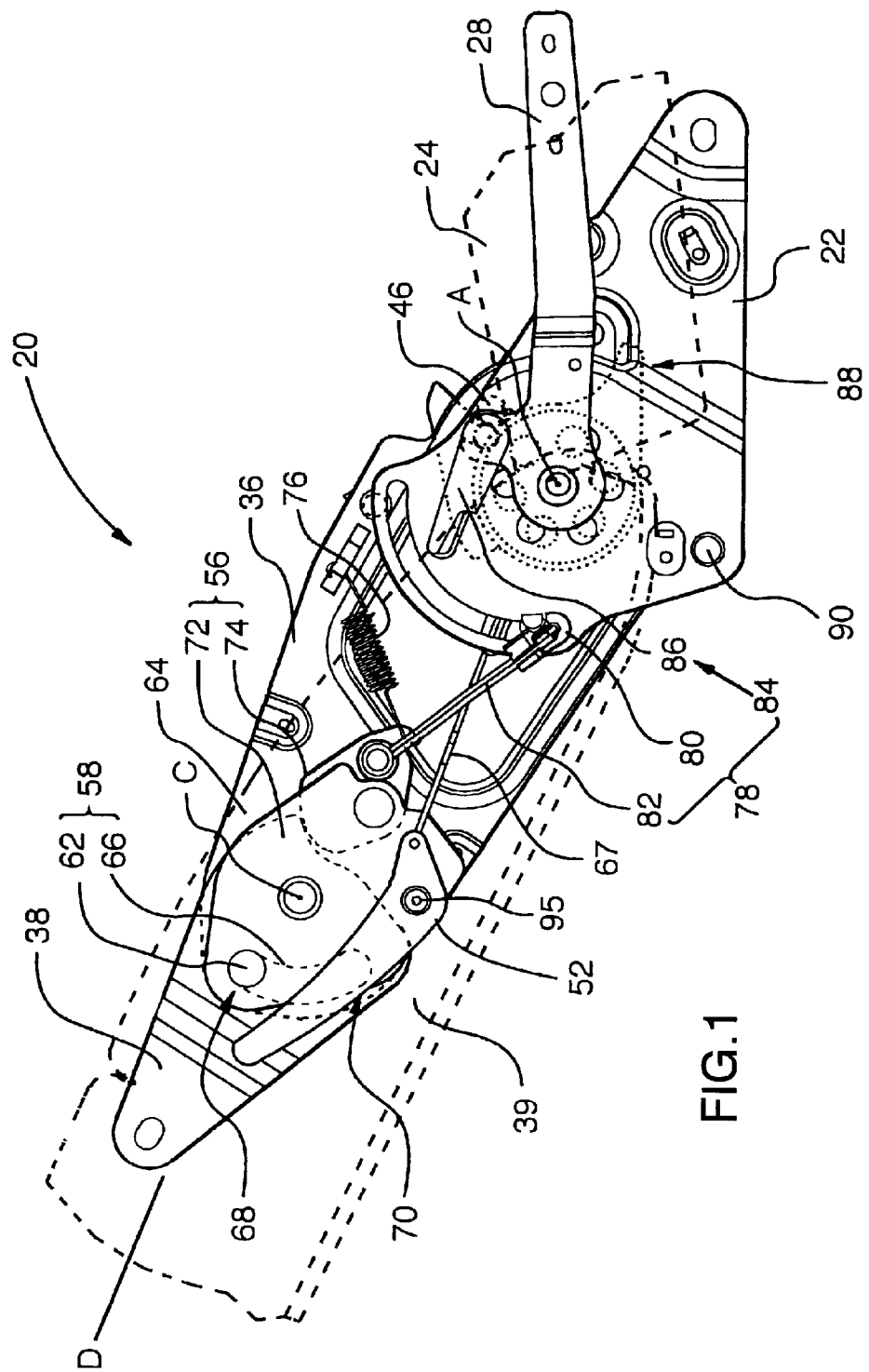
FIG. 1 is a side elevational view of an improved vehicle seat hinge mechanism according to a preferred embodiment of the present invention shown operatively installed in a vehicle seat assembly which has its seat back disposed at a fully-reclined position thereof.
Figure 7:
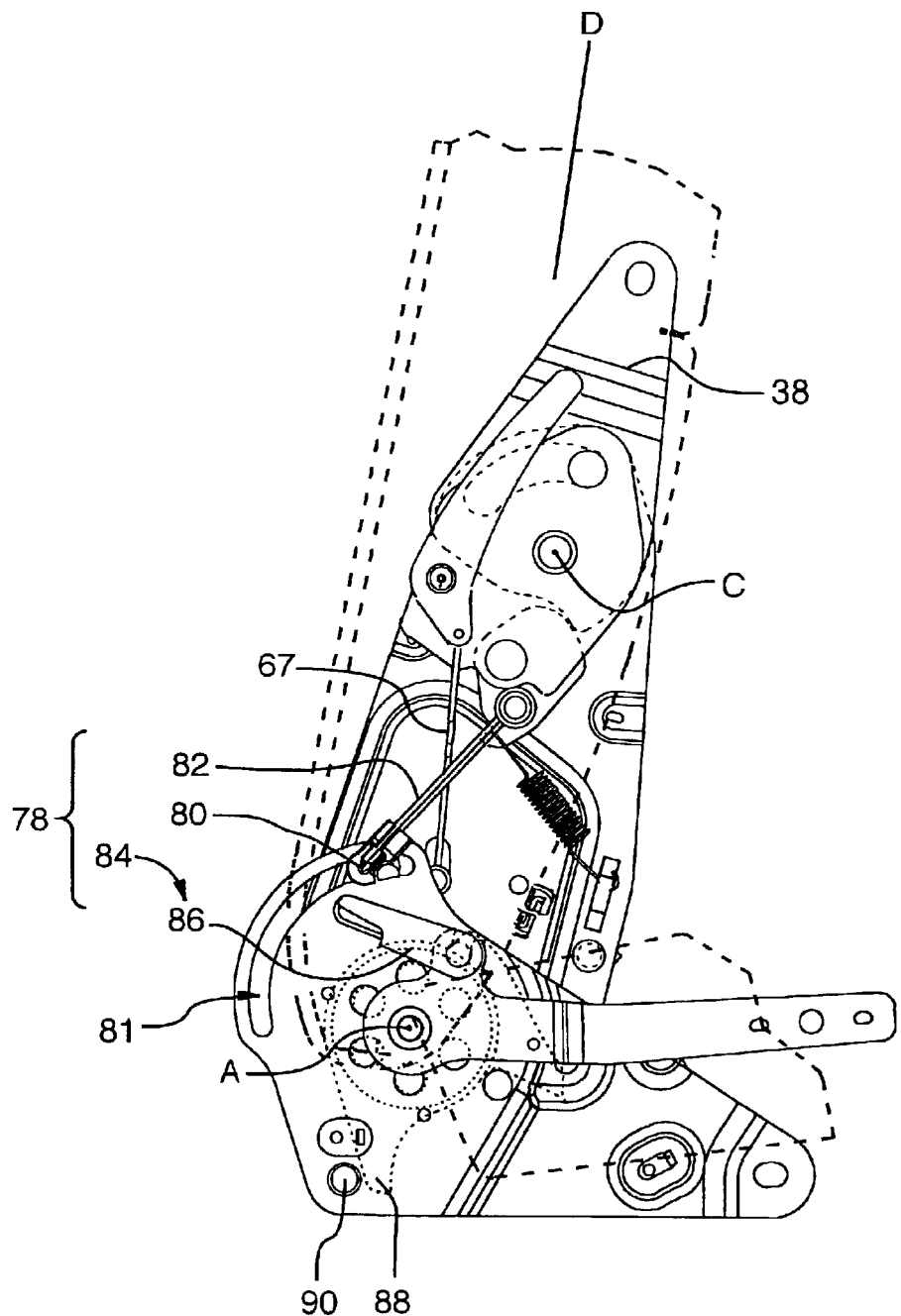
FIG. 7 is a view similar to FIG. 2, with the seat back disposed at the fully-inclined position thereof.

It will be evident to persons of ordinary skill in the art that the foregoing combination is conventional, and provides for the seat back 39 to be pivotally movable with respect to the seat cushion 24 so as to adjust the inclination angle of the seat back 39 about the lower pivot axis A within a range of angular positions which includes a preferred seating position, shown representatively in FIG. 9, a fully-inclined position shown in FIG. 7 and a fully-reclined position shown in FIG. 1 by simple user manipulation of the recliner actuation handle 28.

In the preferred embodiment illustrated, the fully-inclined position and the fully-reclined position of the hinge mechanism are physical limitations of the structure itself, as will be discussed more fully in following paragraphs. However, it should be understood that in other applications, the fully-inclined and fully-reclined positions of the seat back may be a function of co-operating environment, such as, for example, interference with the steering wheel or the seat cushion, or with a row of seats disposed to the rear, or even the floor of a vehicle.

The subject-matter of the present invention comprises an improvement to the foregoing general arrangement.

As part of the improvement, the sector plate 36 is mounted on the second portion 32 of the rotary recliner 26 as aforesaid by means of an idler plate 40, which is best seen in FIG. 14 and FIG. 16. The idler plate 40 is connected in fixed relation to the second portion 32 by conventional means such as staking of pins 33 within complimentary holes 43 for selective simultaneous pivotal movement of the sector plate 36, the idler plate 40, and the second portion 32 about the lower pivot axis A under control of the recliner actuation handle 28. Additionally, idler plate 40 has a bearing surface 42 (best seen in FIG. 16), in the form of an annular shoulder, to which bearing surface 42 the sector plate 36 is journalled. More specifically, a correspondingly sized aperture 41 is formed through sector plate 36, and has the annular shoulder 42 rotatably received therewithin. This arrangement provides for pivotal movement of the sector plate 36 relative to the idler plate 40 about the lower pivot axis A between a first position and a second position, shown in FIG. 1 and FIG. 12, respectively, and discussed more fully in following paragraphs.

The foregoing paragraph defines a second modality of pivotal movement of the sector plate 36 about the lower pivot axis A. Further, through the agency of the sector plate 36 moving in said second modality, the seat back 39 (which is attached to the sector plate 36 in a manner described in more detail below), is pivotally movable with respect to the seat cushion 24 about the lower pivot axis A between a primary position, illustrated in FIG. 1, whereat the sector plate 36 is at its first position, and a secondary position, forwardly tilted relative to the primary position and illustrated in FIGS. 12A and 12B, whereat the sector plate 36 is at its second position.

Figure 9B:
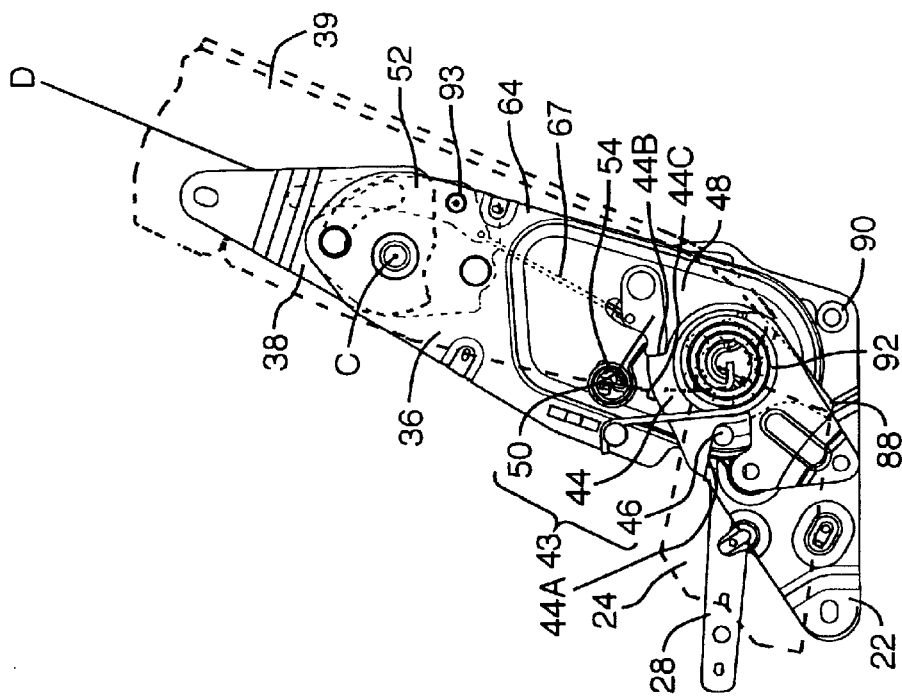
FIG. 9B is a view of the opposite side of the structure of FIG. 9A.

Also provided is a first lock means, designated with general reference numeral 43 in FIGS. 9B and 10B, for selectively releasably locking the sector plate 36 at its first position relative to the idler plate 40 to prevent movement of the sector plate 36 in the second modality.

The first lock means 43 comprises a first latching lug portion 44 formed on the idler plate 40, a first stop dog 46 rigidly extending from a lower portion 48 of the sector plate 36 and a first latch member 50 mounted on the lower portion 48 of the sector plate 36 for pivotal movement between a latched configuration, shown in FIG. 9B, and an unlatched configuration, shown in FIG. 10B. The first stop dog 46 and the first latch member 50 are positioned and mounted such that, when the sector plate 36 is disposed at its first position and the first latch member 50 is disposed in its latched configuration, the first latch member 50 and the first stop dog 46 grippingly engage, as illustrated in FIG. 9B, opposite sides 44a and 44b of the first latching lug portion 44 disposed therebetween to arrest pivotal movement of the sector plate 36 in the second modality. The first latch member 50 is also positioned and mounted such that, in the unlatched configuration, the first latch member 50 disengages the first latching lug portion 44 by sliding up and over the proximal side 44b of the lug portion 44 to thereafter permit pivotal movement of the sector plate 36 in the second modality as the first latch member 50 slides along the top edge surface 44c of the first lug portion 44 (which top edge surface 44c acts as a cam follower surface for the first latch member 50), such pivotal movement being indicated by arrow B in FIG. 10B. This pivotal movement of the sector plate 36 causes consequent forward movement of the seat back 39 towards the dumped position shown in FIGS. 11A and 11B.

Figure 9A:
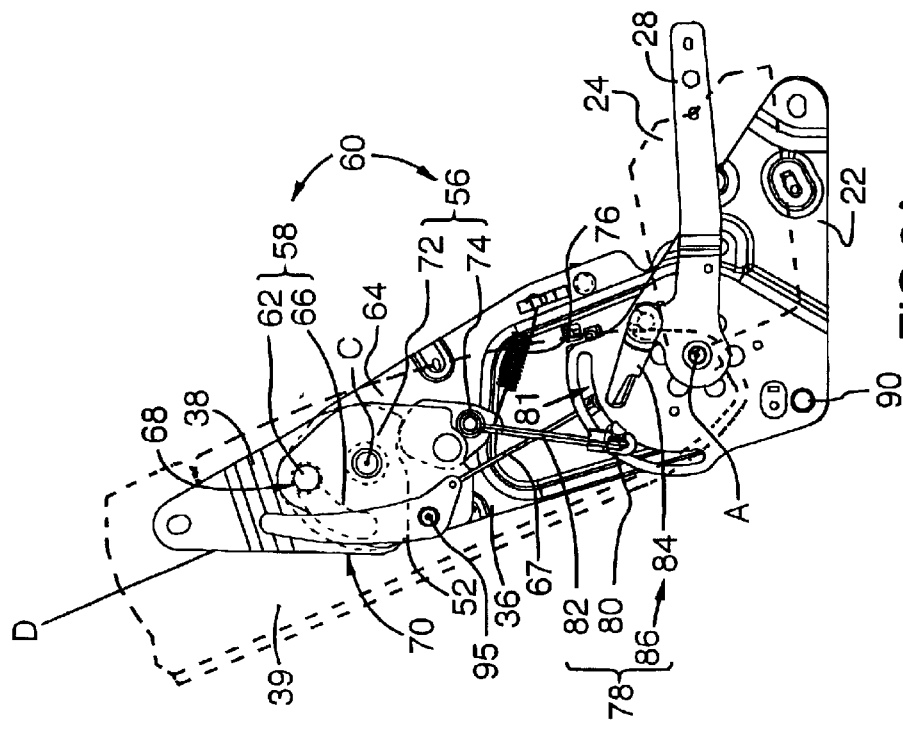
FIG. 9A is a view similar to FIG. 2, with the seat back disposed at a preferred seating position.

As another aspect of the improvement, a quick-release actuation member 52 is provided to control release of the first lock means 43. The quick-release actuation member comprises a quick-release actuation handle, operatively pivotally mounted, by handle mounting pin 95, as seen in FIG. 9A, to an upper part 64 of the sector plate 36 for movement between a rest position, shown in FIG. 9B, and a dumping position, shown in FIG. 10B.

The quick-release actuation handle 52 is operatively connected to the first latch member 50 by a dumping link 67, to urge the first latch member 50 between the unlatched configuration and the latched configuration upon movement of the quick-release actuation handle 52 between the dumping position and the rest position.

Also provided, for assisting with the locking of the first lock means 43, is a first bias means in the form of a first clock spring 54 interconnected between the first latch member 50 and the sector plate 36 so as to bias the first latch member 50 towards its latched configuration, as illustrated in FIG. 10B.

It will be evident to persons of ordinary skill in the art that the foregoing structure in and of itself has enhanced utility over rotary recliner hinge mechanisms of the prior art. Specifically, the foregoing not only permits, under selective control of the recliner actuation handle 28, conventional pivotal movement of the seat back 39 to a preferred seating position within the range of angular positions by way of the sector plate 36 moving in the first modality as described above, but also permits, under control of the quick-release actuation member 52, the seat back 39 to be tilted forwardly for dumping from said preferred seating position by way of the sector plate 36 moving in the second modality. Moreover, the structure described also provides seat back memory by means of reactivation of the first lock means 43 upon return of the seat back 39 in the second modality to the preferred seating position, wherein the first latch member 50 rides back upon such return along the camming surface formed by the top edge surface 44c to drop off of the proximal side 44b of the lug portion 44 at the preferred seating position to again cause lock-up of the first lock means 43 in the manner previously described.

Figure 8:
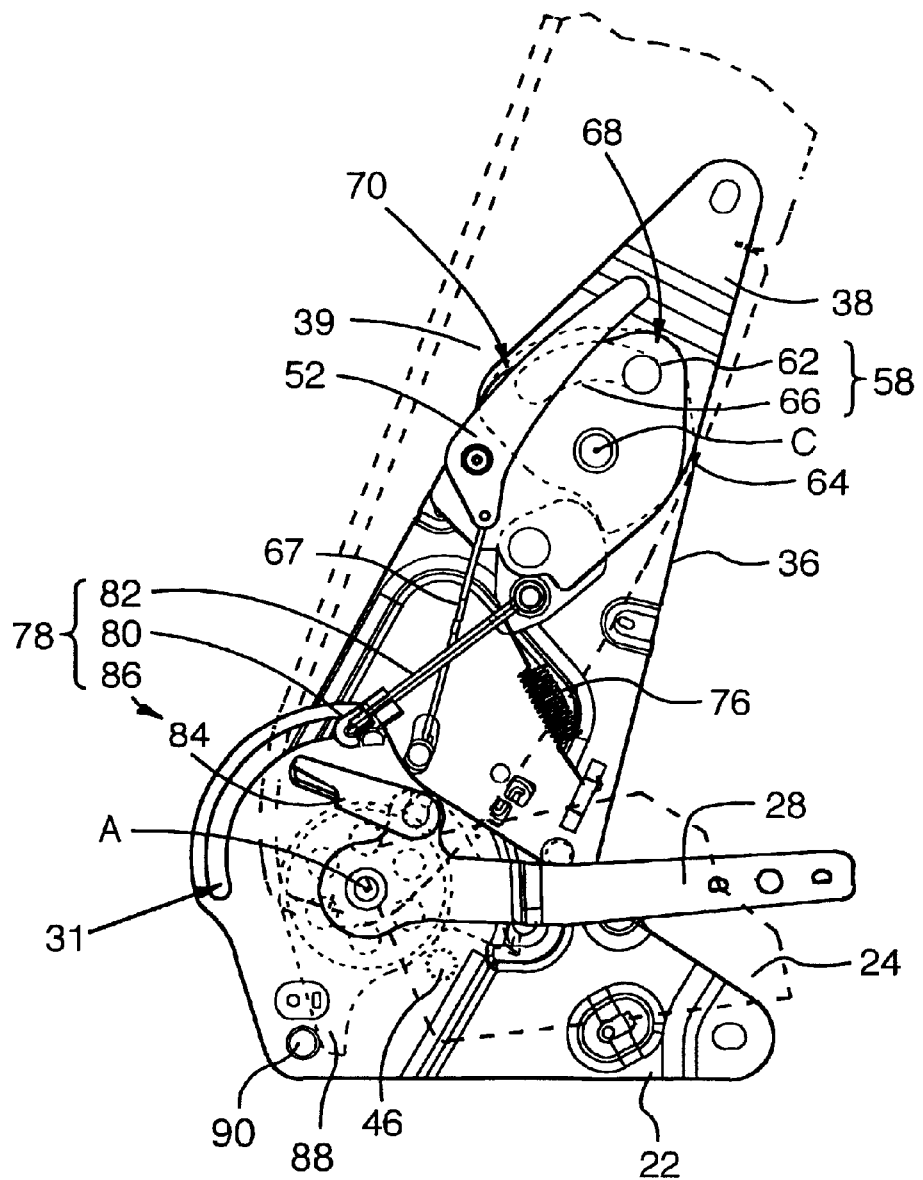
FIG. 8 is a view similar to FIG. 7, with the seat back disposed at its dumped position.
Figure 11B:
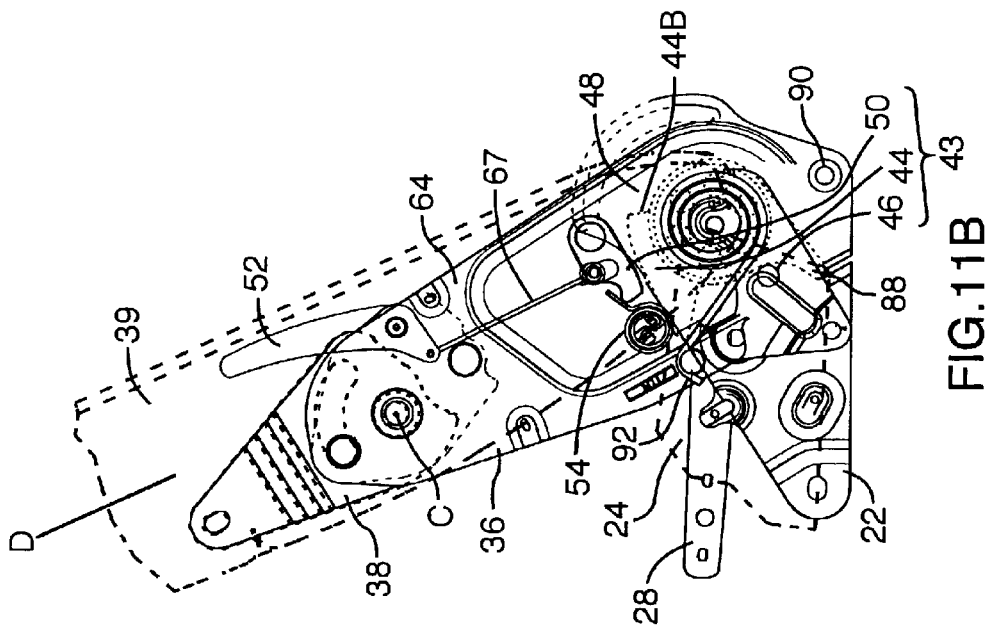
FIG. 11B is a view of the opposite side of the structure of FIG. 11A.
Figure 11A:
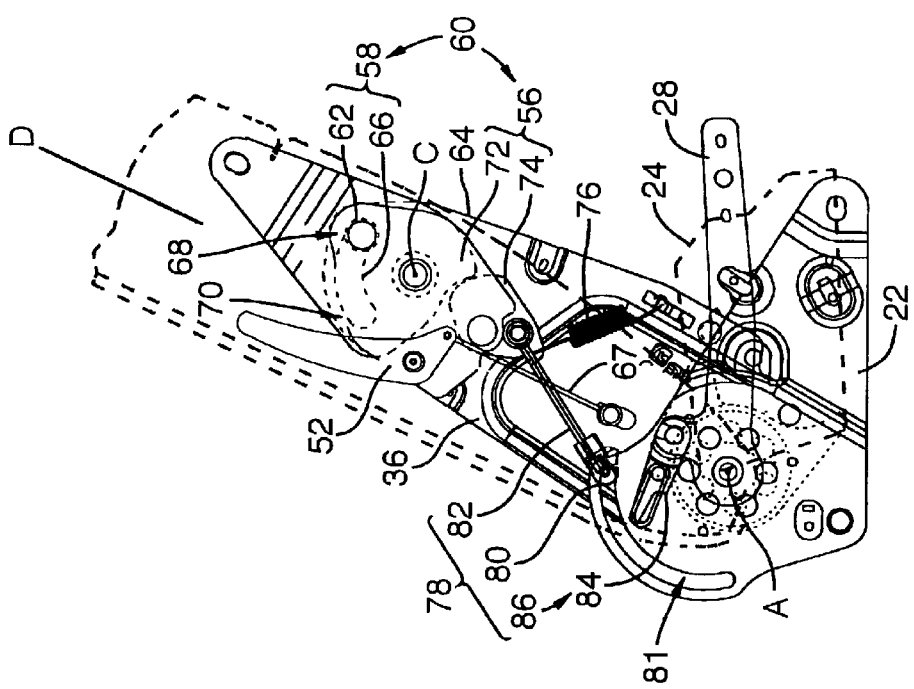
FIG. 11A is a view similar to FIG. 10A, with the seat back at its dumped position.

It should, however, be emphasized at this time that pivotal movement of the seat back 39 to a dumped position, whereat the seat back 39 projects over the seat cushion 24, as shown in FIG. 11A and FIG. 11B, does not necessarily result from release of the first lock means 43. Indeed, in the preferred embodiment illustrated, the idler plate 40 has a third latching lug 88 projecting therefrom which limits the amount by which the sector plate 36 can forwardly tilt by engagement with the first stop dog 46 (and thereby defines the second position of the sector plate 36). Such limit is illustrated in FIGS. 12A and 12B, wherein, as will be immediately evident, the seat back 39 does not overly the seat cushion 24. Rather, in order to ensure movement of seat back 39 to the dumped position thereof, it is first required that the first position of the sector plate 36, from which movement commences during a dumping operation, is disposed sufficiently forwardly, which is effected by tilting the idler plate 40 in the first modality, as discussed previously. However, this requirement does not adversely impact upon in situ utility of the hinge mechanism, since it is not essential that the seat back 39 actually travel in a dumping operation through to the fully dumped position illustrated, as advantage, in terms of ingress and egress, accrues even if the seat back 39 is in absolute terms somewhat rearwardly disposed from the dumped position illustrated in FIG. 8 when the sector plate 36 is at its second position.

Figure 5:
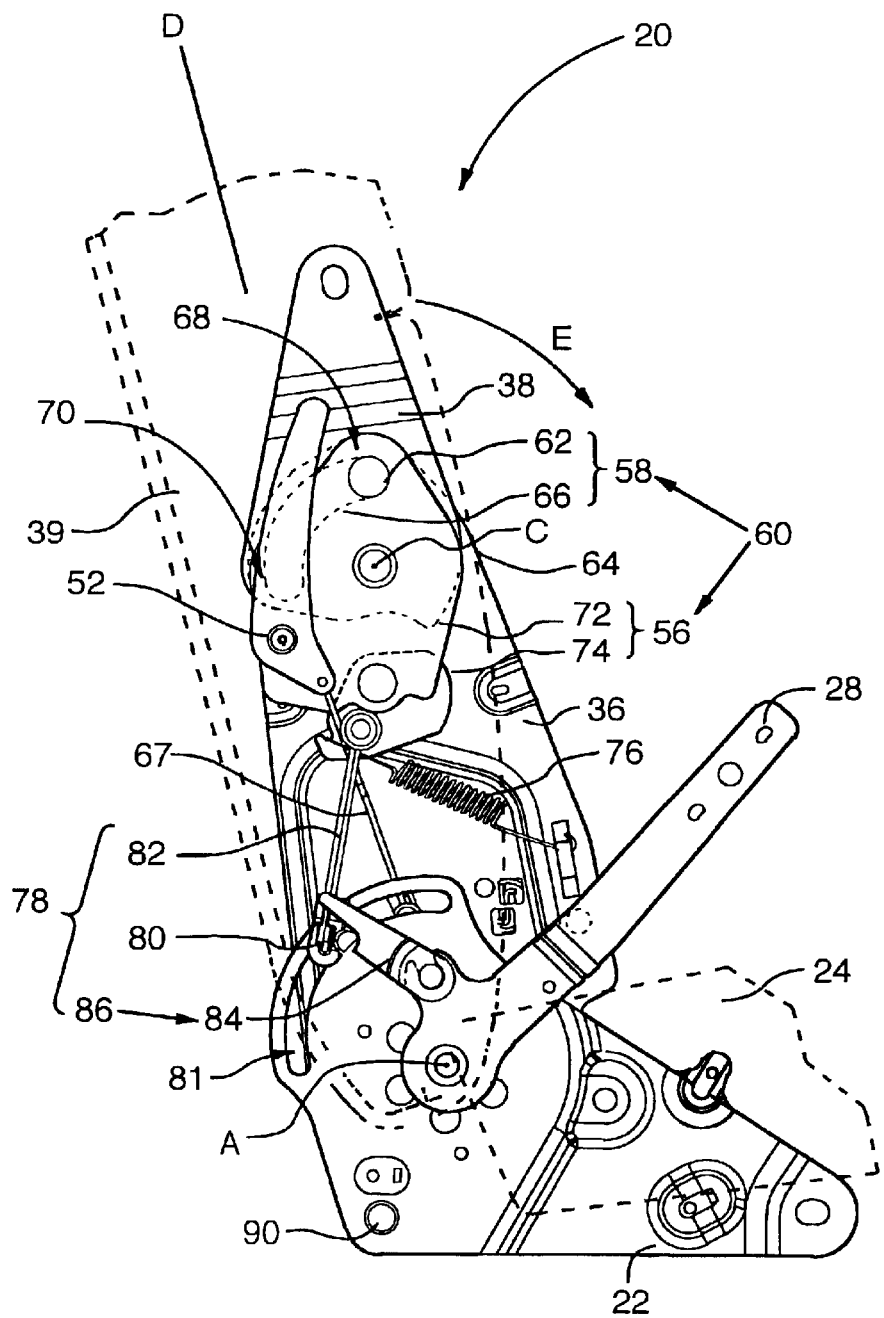
FIG. 5 is a view similar to FIG. 4, with the seat back disposed at its upright position.
Figure 6:
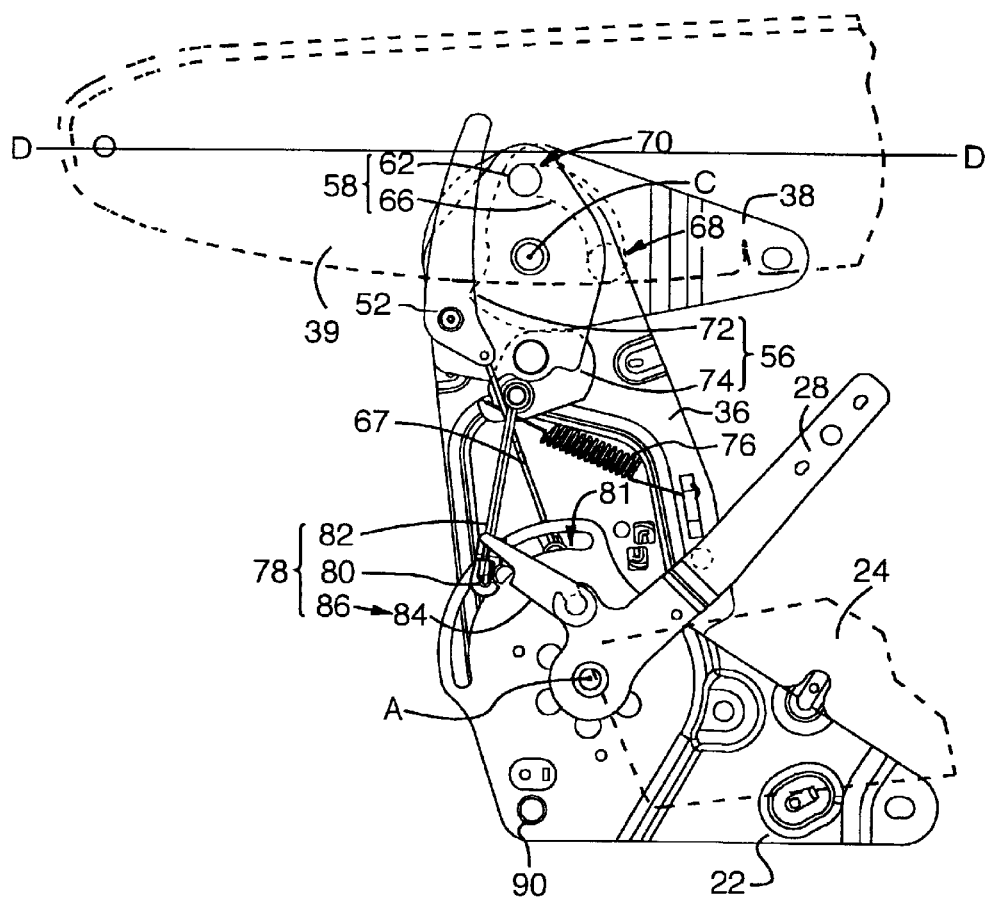
FIG. 6 is a view similar to FIG. 5, with the seat back disposed at its fold-flat position.

In the preferred embodiment illustrated, yet further functionality is incorporated, namely, fold-flat functionality, whereby the seat back 39 can be selectively pivoted between a substantially upright position within the range, as illustrated in FIG. 5, and a fold-flat position, shown in FIG. 6, whereat the seat back 39 substantially horizontally overlies the seat cushion 24.

In the preferred embodiment, such further fold-flat functionality is obtained by a manner of mounting the seat back mounting plate to the sector plate, and by providing a further locking arrangement for selectively permitting pivotal movement of the seat back mounting plate, as hereinafter described.

As to the manner of mounting, the sector plate 36 has a pivot pin 61 extending therefrom which defines an upper pivot axis C, best illustrated in FIG. 16. The seat back mounting plate 38 defines a longitudinal seat back axis D, and is mounted on the sector plate 36 by the pivot pin 61 for pivotal movement, about the upper pivot axis C, and relative to the sector plate 36, between an extending position, shown in FIG. 5, whereat the longitudinal seat back axis D is arranged in substantially radial relation to the lower pivot axis A, and a nesting position whereat the longitudinal seat back axis D has been rotated approximately 90° relative to its orientation at the extending position, as shown in FIG. 6. This arrangement provides for the seat back 39 to be pivotally movable with respect to the seat cushion 24, by agency of the seat back mounting plate 38 pivotally moving between its extending position and its nesting position, between its upright position and its fold-flat position.

Figure 4:
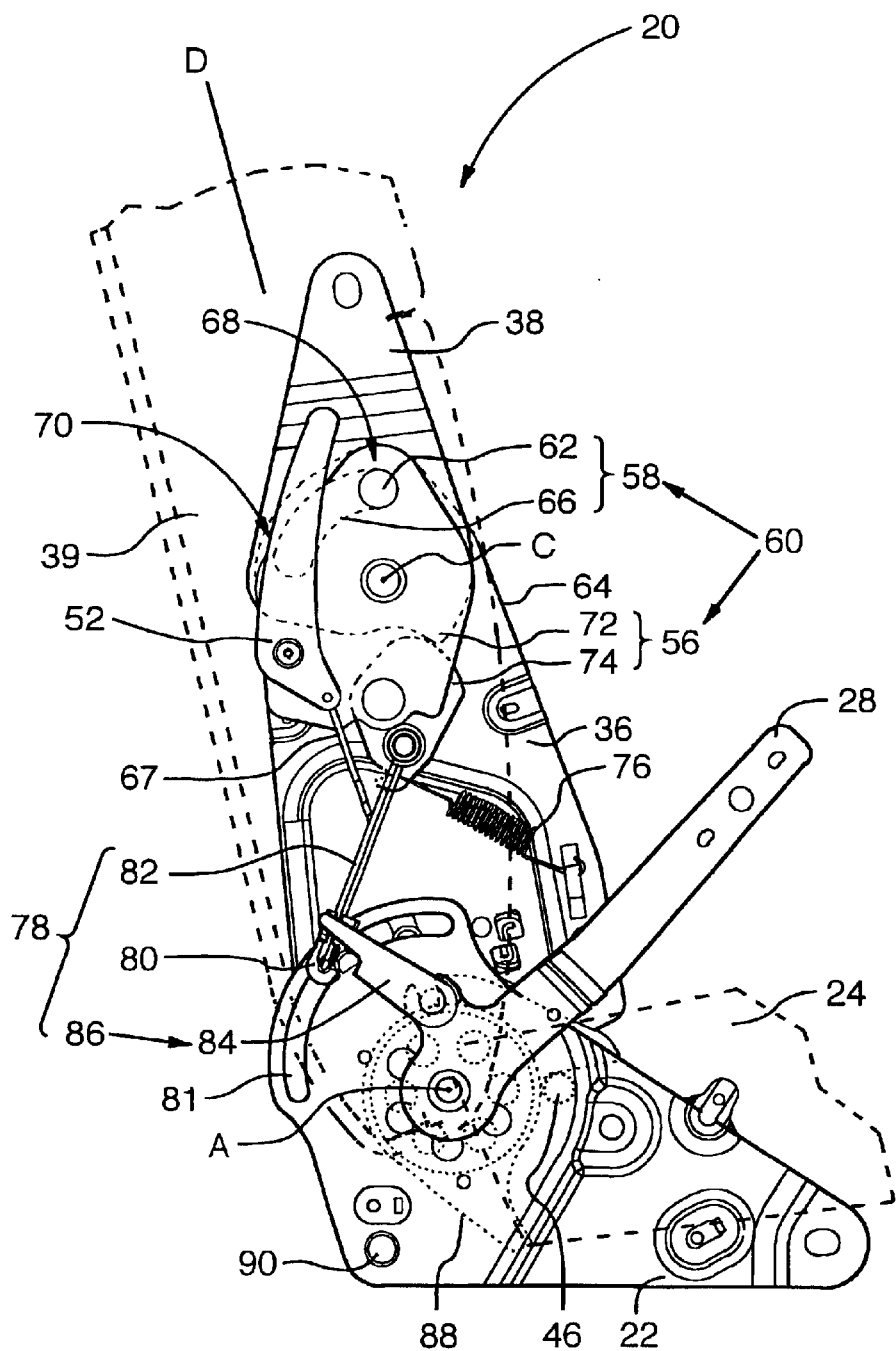
FIG. 4 is a view similar to FIG. 3, with the seat back slightly tilted forwardly relative to its position in FIG. 3.

The further locking arrangement comprises a second lock means, designated with general reference 60 in FIGS. 3–5, for selectively releasably locking the seat back mounting plate 38 at its extending position. The second lock means 60 comprises a first part 58, which constrains pivotal movement of the seat back mounting plate 38 between the nesting position thereof and the extending position thereof, thereby to permit movement of the seat back mounting plate 38 in only a single direction, namely, towards the nesting position, when it is disposed at the extending position, and a second part 56, which selectively arrests such movement of the seat back mounting plate 38 in said single direction when it is disposed at the extending position.

The first part 58 of the second lock means 60 comprises a limit pin 62, best seen in FIG. 16, rigidly extending from the upper portion 64 of the sector plate 36 and an arcuate slot 66 formed through the seat back mounting plate 38. As illustrated in FIG. 15, the arcuate slot 66 has the limit pin 62 extending therethrough and is shaped and dimensioned to limit rotation of the seat back mounting plate 38, relative to the sector plate 36 and about the upper pivot axis C, between its extending position and its nesting position. (For greater clarity in this regard, it will be observed that, in FIG. 3, wherein the seat back mounting plate 38 is disposed at its extending position, the limit pin 62 is positioned adjacent the leading end 68 of the slot 66, whereas in FIG. 6, wherein the seat back mounting plate 38 is disposed at its nesting position, the limit pin 62 is positioned adjacent the trailing end 70 of the slot 66.)

As illustrated in FIGS. 3–6, the second part 56 of the second lock means 60 comprises a second latching lug portion 72 formed on the seat back mounting plate 38 and a second latch member 74 mounted on the upper portion 64 of the sector plate 36 for pivotal movement between a latched configuration, shown in FIG. 3, whereat the second latch member 74 engages the second latching lug portion 72 to arrest said pivotal movement of the seat back mounting plate 38, and an unlatched configuration, shown in FIG. 5, whereat the second latch member 74 disengages the second latching lug portion 72 to permit said pivotal movement of the seat back mounting plate 38 between its extending position and its nesting position, as indicated by arrow E in FIG. 5.

The present invention also comprises further features, which add to the utility of the aforementioned fold-flat functionality.

One such further feature is a second bias means for causing said locking of the second lock means 60, namely, a second coil spring 76 connected between the sector plate 36 and the second latch member 74 to bias the second latch member 74 towards its latched configuration. This avoids the need for the second latch member 74 to be manually manipulated towards its latched configuration.

Another such further feature is an automatically acting actuation means for the second lock means 60, which actuation means is designated by the general reference numeral 78 in FIGS. 2–5. The actuation means releases the second lock means 60 under the control of the recliner actuation member 28 under certain conditions of use, namely, when the recliner actuation member 28 is at its in-use position, and upon forward pivotal movement of the seat back 39 to the upright position thereof from a triggering position thereof, which triggering position is inclined rearwardly relative to the upright position. This provides for "single-handle" functionality, which among other things, adds to simplicity of the design, positive ergonomics thereof with resultant consumer acceptance.

The actuation means 78 comprises a control member 80, a link member 82, and an arresting means, designated with general reference numeral 84.

Figure 2:
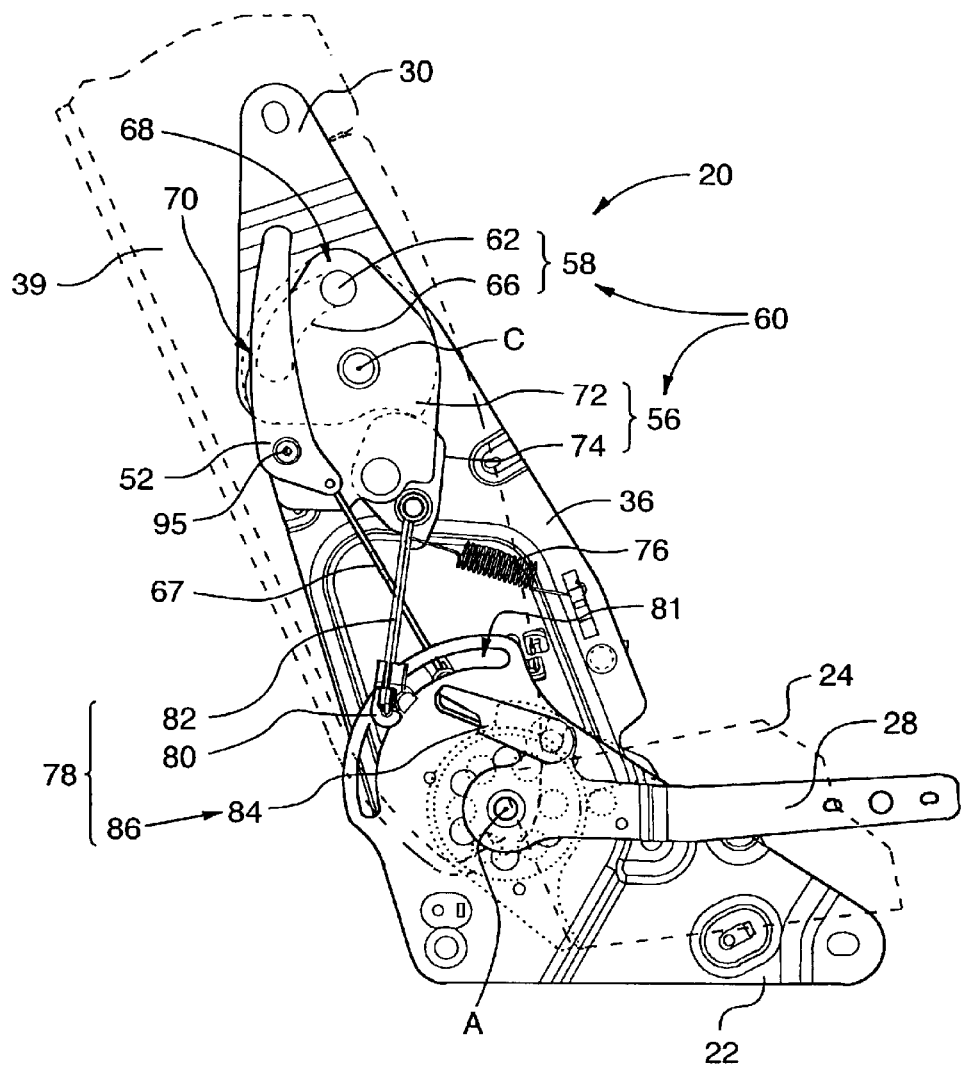
FIG. 2 is a view similar to FIG. 1, with the seat back disposed at the triggering position thereof and the recliner actuation handle disposed at its rest position.

The control member 80 is mounted on the seat cushion mounting plate 22 in a sectoral slot 81 for reversible sliding movement relative to said mounting plate 22 from a first limit position shown in FIG. 1, through an intermediate position shown in FIG. 2, to a second limit position, shown in FIG. 11A.

The link member 82 connects the control member 80 to the second latch member 74. This drives sliding movement of the control member 80 to its intermediate position upon movement of the seat back 39 to the triggering position shown in FIG. 2, and from its intermediate position towards its second limit position upon movement of the seat back 39 from the triggering position to the upright position, as shown in FIG. 5.

It will be noted that, at the upright position of the seat back 39, the control member 80 is not at the second limit position, but is only moved towards the same; movement of the control member 80 to its second limit position actually occurs only at, and defines, the dumped position of the seat back 39, that is, the most forwardly tilted position of the seat back 39. Similarly, rearward tilting of the seat back 39 results in movement of the control member 80 until it reaches its first limit position; the position of the seat back 39 when the first limit position is reached defines the fully-reclined position of the seat back 39.

The arresting means 84 is adapted for selectively arresting, upon movement of the recliner actuation handle 28 from its rest position to its in-use position, sliding movement of the control member 80 beyond the intermediate position towards the second limit position. This causes, through the agency of the link member 82, the second latch member 74 to pivotally move from its locked configuration to its unlocked configuration upon movement of the seat back 39 from the triggering position to the upright configuration, as indicated by the sequence of FIGS. 3, 4 and 5, and thereafter permits the seat back 39 to be pivotally movable from the upright position to the fold-flat configuration as aforementioned, as indicated by the sequence of FIGS. 5, 6.

As best indicated in FIG. 14, the arresting means 84 comprises a stop member 86 having a stud 87 rigidly extending therefrom at one end, and a slider 91 rigidly extending therefrom at another end. The stud 87 is journalled in a corresponding socket 89 provided on the recliner actuation handle 28 and the slider 91 is slidably mounted within a corresponding radial guide slot 93 provided on the seat cushion mounting plate 22.

This operatively mounts the stop member 86 so as to provide, upon movement of the recliner actuation handle 28 from its rest position to its in-use position, for guided movement of the stop member 86 from a stop member rest position shown in FIG. 1, whereat the stop member 86 is positioned so as to be clear of interaction with the control member 80, to a stop member blocking position shown in FIG. 3, whereat the stop member 86 is positioned to engage the control member 80 at the intermediate position to restrain the control member 80 from further sliding movement beyond its intermediate position towards its second limit position.

Another desirable feature, as illustrated in, inter alia, FIG. 13, is a third biasing means, being a clock spring 92, which clock spring 92 is interconnected between the sector plate 36 and the seat cushion mounting plate 22 (by means of mounting bracket 97 affixed to the seat cushion mounting plate 22), and a spring post 99 affixed to the sector plate 36. In this manner, the sector plate 36 is biased by the clock spring 92 for movement towards its second position. This is convenient, among other things, when adjusting the desired degree of reclination of the seat back 39, since it would be otherwise necessary for an occupant to draw the seat back 39 forward, while at the same time gripping the recliner actuation handle 28, which would be unwieldy.

In the preferred embodiment, the third clock spring 92 is sufficiently tensioned to urge the seat back 39 to the triggering position upon movement of the recliner actuation handle 28 to the in-use position, but insufficiently tensioned to overcome, without external assistance, the second coil spring 76 which maintains the second latch member 74 at its latched configuration.

Another preferable feature of the invention relates to a strengthening bracket 71, best shown in FIG. 16, rigidly attached to the limit pin 62 and to the pivot pin 61. The strengthening bracket 71 is disposed in spaced relation to the sector plate 36, with the seat back mounting plate 38 (and the first latch member 50) disposed therebetween. This provides for greater rigidity in the structure, specifically, in the rigidity of the connection and mounting of the seat back mounting plate 38 to and on the sector plate 36.

The fully-inclined position of seat back 39 is defined by an anchor dog 90. Specifically, the anchor dog 90 is operatively connected to the seat cushion mounting plate 22 and is positioned to engage the third latching lug portion 88, as indicated in FIG. 7, upon movement of the idler plate 40 to a relatively forward position thereof. The position at which the anchor dog 90 is placed defines the fully-inclined position of the idler plate 40, and the seat back 39. The inclusion of the anchor dog 90 adds to the overall safety of the design since, in the event that the internal locking components of the rotary recliner 26 were to fail in, for example, a collision, forward motion of the seat back 39 would nonetheless be arrested by the anchor dog 90. As well, having the "fully-inclined position" of the seat back 39 being slightly rearwardly disposed from the "dumped position" of the seat back, avoids loading that could otherwise be placed on link member 82 and control member 80, for example, in circumstances wherein the seat assembly is unoccupied, and the seat back 39 is permitted to swing forwardly upon movement of the recliner actuation handle 28 away from its rest position.

In use, in order for an occupant to position the vehicle seat back 39 at a preferred seating position, such as that shown representatively in FIG. 9A, the recliner actuation handle 28 is rotated from its rest position, seen in FIG. 2, by being manually lifted at its free end by the occupant, as shown by arrow F in FIG. 3, towards its in-use position shown in FIG. 3. This action frees the first 30 and second 32 parts of the rotary recliner 26 for relative movement, thereby to permit pivotal movement of the seat back 39 about lower pivot axis A by agency of the sector plate 36 moving in the first modality. The occupant can then, as desired, urge the seat back 39 rearwardly, by the application of continued pressure thereagainst, via, for example, his or her back, or allow the seat back 39 to move forwardly under impulse of clock spring 92, as indicated by arrow G in FIG. 3. Once the seat back 39 has been positioned at the preferred seating position, the recliner actuation handle 28 returns to its rest position, whereat the first 30 and second 32 parts of the rotary recliner 26 are locked against rotation by the internal locking components, as previously discussed, to stabilize the position of seat back 39.

In order for a user to effect a dumping operation (which will typically occur when the seat assembly is unoccupied), the user can rotate the quick-release actuation handle 52 from its rest position, shown in FIG. 9B, to its dumping position, shown in FIG. 10B. This causes the first latch member 50 to slide, from its latched configuration, shown in FIG. 9B, up and over the proximal side 44B of the first latching lug portion 44, to its unlatched configuration, shown in FIG. 10B. Thereafter, the seat back 39, under biasing of clock spring 92 travels forwardly to its dumped position, shown in FIG. 8 (or, in the event that the idler plate 44 is relatively rearward disposed at the preferred seating position, until such time as the seat back 39 reaches its secondary position, as discussed more fully in earlier paragraphs).

During such forward travel, the first latch member 50 slides forwardly along the top edge surface 44C of the first lug portion 44. The seat back 39 can thereafter be manually manipulated backward, against the force of clock spring 92, to the preferred seating position. During such backward manual manipulation, the first latch member 50 slides rearwardly along the top edge surface 44C of the first lug portion 44, and drops off the proximal side 44B into its latched configuration at the preferred seating position, to lock the seat back 39 thereat.

In order for a user to move the seat back 39 to the fold-flat position, the seat back 39 must initially be disposed at the triggering position shown in FIG. 2, or a position rearwardly disposed therefrom. So as to ensure that this condition is met, a typical user will carry out an initial seat positioning procedure, namely, the user, standing to the side of the seat back 39, will position the vehicle seat back 39 relatively near the fully reclined position shown in FIG. 1, by rotating the recliner actuation handle 28 away from its rest position, to free the seat back 39 for movement as discussed above, and then urging the seat back 39 rearwardly, by manual manipulation, to the fully-reclined position, or a position near thereto.

It will be noted that during this initial positioning procedure, the recliner actuation handle 28 need be rotated away from the rest position thereof only sufficiently to cause the internal locking components of the rotary recliner to assume their unlocked configurations, as discussed more fully in earlier paragraphs.

Once the initial positioning procedure has been completed, it becomes necessary to ensure that the recliner actuation handle 28 is rotated substantially entirely to its in-use position, to enable movement of the seat back 39 to the fold-flat position. (The user can be certain that the recliner actuation handle 28 is at its in-use position when further rotation is arrested, which will occur when the slider 91 travels to the end of the radial guide slot 93.) The stop member 86 is moved, by rotation of the recliner actuation handle 28 to the in-use position, to the stop member blocking position shown in FIG. 3. Thereafter, the seat back 39 can be released by the user to allow clock spring 92 to urge the seat back forwardly to the triggering position, shown in FIG. 3. This movement causes sliding movement of the control member 80 to its intermediate position, by agency of the link member 82. Movement of the control member 80 beyond its intermediate is arrested by the stop member 80. Since the control member 80 is connected by the link member 82 to the second latch member 74, further movement of the seat back 39 can occur only through movement of the second latch member 74, but the force exerted by the clock spring 92 is insufficient to counter the forces exerted by the second coil spring 76, such that movement of the seat back 39 under action of clock spring 92 substantially ceases at the triggering position. The seat back 39 can, however, be manually moved, by hand, forwardly, to the upright position thereof. This causes, through the agency of the link member 82, the second latch member 74 to pivotally move from its locked configuration to its unlocked configuration, as indicated by the sequence of FIGS. 3, 4 and 5, whereupon the second latching lug portion 72 of the seat back mounting plate 38 is freed. This permits the seat back mounting plate 38 to be rotated about the upper pivot axis C from its extending position shown in FIG. 5 to its nesting position shown in FIG. 6, and consequent movement of the seat back 39 carried thereby from its upright position and the fold-flat position.

The recliner actuation handle 28 will typically be released after the second latch member 74 is moved to its unlatched configuration, thereby locking the idler plate 44 and the sector plate 36 carried thereby in position.

When the user desires to restore the seat back 39 to a generally upright, occupiable position, the seat back 39 can be rotated by hand to its upright position. During such rotation, second coil spring 76 urges the second latch member 74 against the seat back mounting plate 38, with the effect that second latch member 74 is urged into its latching configuration against the second lug portion 72 when the seat back 39 reaches its upright position. From this position, the seat back 39 can be positioned anew at the preferred seating position, as discussed above.

Various modifications and alterations may be used in the design and manufacture of the hinge mechanism according to the present invention without departing from the spirit and scope of the invention.

For example, only, whereas in the preferred embodiment illustrated, the idler plate 40 and the second portion 32 of the rotary recliner 26 are distinct elements, they could be constructed integrally, with equal utility.

Similarly, whereas the seat back mounting plate 38 and the first portion 30 of the rotary recliner 26 of the preferred embodiment illustrated are distinct elements, they also could be constructed integrally, with equal utility.

As well, whereas in the preferred embodiment illustrated, the clock spring 92 is insufficiently tensioned to effect unlatching of the second latch member 74, this effect could be obtained, if desired.

Also, the third latching lug 88 of the preferred embodiment could be omitted. (In this event, the second position of the sector plate would, of course, not be defined by contact between the third latching lug and the first stop dog, but would instead be defined either by other mechanical interferences in the hinge mechanism itself, or interferences vis a vis the cooperating environment, for example, interference between the seat back and the seat cushion, or with a steering wheel.) However, mere removal of the third latching lug is not preferred, since, all other things being equal, that would inter alia place unnecessary loading on the link member 82 and the control member 80 during typical dumping operations.

Yet further, it should be understood that, notwithstanding in the preferred embodiment illustrated, the dumped position of the seat back 39 is defined by movement of the control member 80 to the end of the sectoral slot 81, this need not be the case. Rather, the dumped position of the seat back 39 could also be defined, for example, by interference of the seat back 39 with the seat cushion 24, or by movement of the sector plate 36 to the second position when the idler plate 40 is at its fully inclined position.

Accordingly, it should be understood that the scope of the invention is limited only by the accompanying claims, purposively construed.

We claim:

1. An improved vehicle seat hinge mechanism for use in a vehicle seat assembly, said improved vehicle seat hinge mechanism being of a type having:

a seat cushion mounting plate securely attachable to a vehicle seat cushion;

a rotary recliner having a first portion and a second portion, said first portion defining a lower pivot axis and being rigidly attached to said seat cushion mounting plate and said second portion being mounted to said first portion for selective pivotal movement relative thereto about said lower pivot axis under control of a recliner actuation handle;

a sector plate operatively mounted on said second portion for selective pivotal movement therewith about the lower pivot axis under the control of said recliner actuation handle as aforesaid, thereby defining a first modality of pivotal movement of said sector plate about said lower pivot axis; and a seat back mounting plate operatively mounted on said sector plate and securely attachable to a vehicle seat back, so as to provide, when installed in said vehicle seat assembly and through agency of said sector plate moving in said first modality, for said seat back to be pivotally movable with respect to said seat cushion about said lower pivot axis within a range of angular positions including a preferred seating position, a fully-inclined position and a fully-reclined position, wherein the improvement comprises:

having the sector plate mounted on said second portion of the rotary recliner as aforesaid by means of an idler plate, with the idler plate being in fixed relation to said second portion for selective simultaneous pivotal movement of the sector plate, the idler plate and the second portion about said lower pivot axis under control of the recliner actuation handle in said first modality; and having a bearing surface to which the sector plate is journalled to provide for pivotal movement of said sector plate relative to said idler plate about the lower pivot axis between a first position and a second position, thereby to define a second modality of pivotal movement of the sector plate about said lower pivot axis and to provide, when said improved vehicle seat hinge mechanism is installed in said vehicle seat assembly and through agency of said sector plate moving in said second modality, for said seat back to be pivotally movable with respect to said seat cushion about said lower pivot axis between a primary position, whereat the sector plate is at its first position, and a secondary position, tilted forwardly relative to the primary position, whereat the sector plate is at its second position;

a quick-release actuation member;

a first lock means for selectively releasably locking the sector plate at its first position relative to the idler plate to prevent movement of the sector plate in said second modality, such release being under control of said quick-release actuation member; and first bias means for causing said locking of the first lock means, thereby, when the improved vehicle seat hinge mechanism is installed in said vehicle seat assembly, to permit, under control of the recliner actuation handle, pivotal movement of the seat back to said preferred seating position within said range of angular positions, by agency of said sector plate moving in said first modality;

to permit, under control of the quick-release actuation member, the seat back to be tilted forwardly from said preferred seating position towards a forwardly dumped position, whereat the seat back overhangs the seat cushion, by agency of said sector plate moving in said second modality; and to provide seat back memory by means of activation of said first lock means upon return of the seat back in said second modality to said preferred seating position.

2. A hinge mechanism according to claim 1, wherein the sector plate defines an upper pivot axis and the seat back mounting plate defines a seat back axis and is mounted on said sector plate for pivotal movement, about said upper pivot axis and relative to the sector plate, between an extending position, whereat the seat back axis is arranged substantially radially relative to the lower pivot axis, and a nesting position, substantially transverse to the extending position, so as to provide, when said hinge mechanism is installed in said vehicle seat assembly, for said seat back to be pivotally movable with respect to said seat cushion, by agency of said seat back mounting plate pivotally moving between its extending position and its nesting position, between a substantially upright position within the range and a fold-flat position, whereat the seat back substantially horizontally overlies the seat cushion.

3. A hinge mechanism according to claim 2, further comprising a second lock means for selectively releasably locking the seat back mounting plate at its extending position.

4. A hinge mechanism according to claim 3, further comprising second bias means for causing said locking of the second lock means.

5. A hinge mechanism according to claim 4, further comprising an actuation means for releasing the second lock means, under control of the recliner actuation member, upon pivotal movement of the seat back to the upright position from a triggering position which is tilted rearwardly relative to the upright position.

6. A hinge mechanism according to claim 5, wherein the first lock means comprises:

a first latching lug portion formed on the idler plate; and a first latch member mounted on a lower portion of the sector plate for pivotal movement between a latched configuration, whereat said first latch member engages said first latching lug portion to arrest pivotal movement of the sector plate in said second modality, and an unlatched configuration, whereat said first latch member disengages said first latching lug portion to permit pivotal movement of the sector plate in said second modality.

7. A hinge mechanism according to claim 6, wherein the first lock means further comprising a first stop dog rigidly extending from the lower portion of the sector plate and positioned such that, when the sector plate is disposed at its first position and the first latch member is disposed in its latched configuration, the first latching lug portion is gripped between the first stop dog and the first latch member.

8. A hinge mechanism according to claim 7, wherein the second lock means comprises:

a second latching lug portion formed on the seat back mounting plate;

a second latch member mounted on an upper portion of the sector plate for pivotal movement between a latched configuration, whereat said second latch member engages said second latching lug portion to arrest said pivotal movement of the seat back mounting plate, and an unlatched configuration, whereat said second latch member disengages said second latching lug portion to permit said pivotal movement of the seat back mounting plate between its extending position and its nesting position.

9. A hinge mechanism according to claim 8, wherein the second lock means further comprises:

a limit pin rigidly extending from the upper portion of the sector plate;

an arcuate slot formed through the seat back mounting plate, said slot having the limit pin extending therethrough and being shaped and dimensioned to limit rotation of the seat back mounting plate, relative to the sector plate and about the upper pivot axis, between its extending position and its nesting position.

10. A hinge mechanism according to claim 9, wherein the idler plate has a third latching lug projecting therefrom and positioned so as to engage the first stop dog upon movement of the sector plate to its second position in the second modality.

11. A hinge mechanism according to claim 10, further comprising an anchor dog operatively rigidly connected to the seat cushion mounting plate and positioned so as to engage the third latching lug portion upon movement of the idler plate to a fully-inclined position, defined by the fully-inclined position of the seat back.

12. A hinge mechanism according to claim 11, wherein the first bias means comprises a first spring connected between the first latch member and the sector plate to bias the first latch member towards its latched configuration.

13. A hinge mechanism according to claim 12, wherein the second bias means comprises a third spring connected between the sector plate and the second latch member to bias the second latch member towards its latched configuration.

14. A hinge mechanism according to claim 13, further comprising a recliner actuation handle operatively mounted to the seat cushion mounting plate for pivotal movement between a rest position and an in-use position and operatively connected to the rotary recliner so as to permit said pivotal movement of the second portion of the rotary recliner upon movement of the recliner actuation handle away from the rest position.

15. A hinge mechanism according to claim 14, wherein the actuation means comprises:

a control member mounted on the seat cushion mounting plate for reversible relative sliding movement from a first limit position, through an intermediate position, to a second limit position;

a link member connecting said control member to said second latch member to drive said sliding movement of the control member to its intermediate position upon movement of the seat back to the triggering position, and from its intermediate position towards its second limit position upon movement of the seat back, from the triggering position to the upright position, arresting means for selectively arresting, under control of movement of the recliner actuation handle from its rest position to its in-use position, said sliding movement of the control member beyond said intermediate position towards said second limit position, so as to cause, when the hinge mechanism is installed in said vehicle seat assembly and through agency of said link member, said second latch member to pivotally move from its locked configuration to its unlocked configuration upon movement of the seat back from the triggering position to the upright configuration, and thereafter permit said seat back to be pivotally movable from the upright position to the fold-flat configuration as aforementioned.

16. A hinge mechanism according to claim 15, wherein the arresting means comprises a stop member operatively connected to the recliner actuation handle and the seat cushion mounting plate so as to provide, upon movement of the recliner actuation handle from its rest position to its in-use position, for guided movement of the stop member from a stop member rest position, whereat said stop member is positioned so as to be clear of interaction with said control member, to a stop member blocking position, whereat said stop member is positioned to engage said control member at the intermediate position to restrain the control member from sliding movement beyond said intermediate position towards said second limit position.

17. A hinge mechanism according to claim 16, further comprising a third spring interconnected between the sector plate and the mounting plate and biasing the sector plate for movement towards its second position.

18. A seat hinge mechanism according to claim 17, wherein the quick-release actuation member is a quick-release actuation handle, operatively pivotally mounted to the upper part of the sector plate for movement between a rest position and a dumping position and operatively connected to the first lock means to release same upon movement to the dumping position.

* * * * *